May 27, 1924.
T. H. DEBNAM ET AL
SPRAYER
Filed Feb. 8, 1923
1,495,506
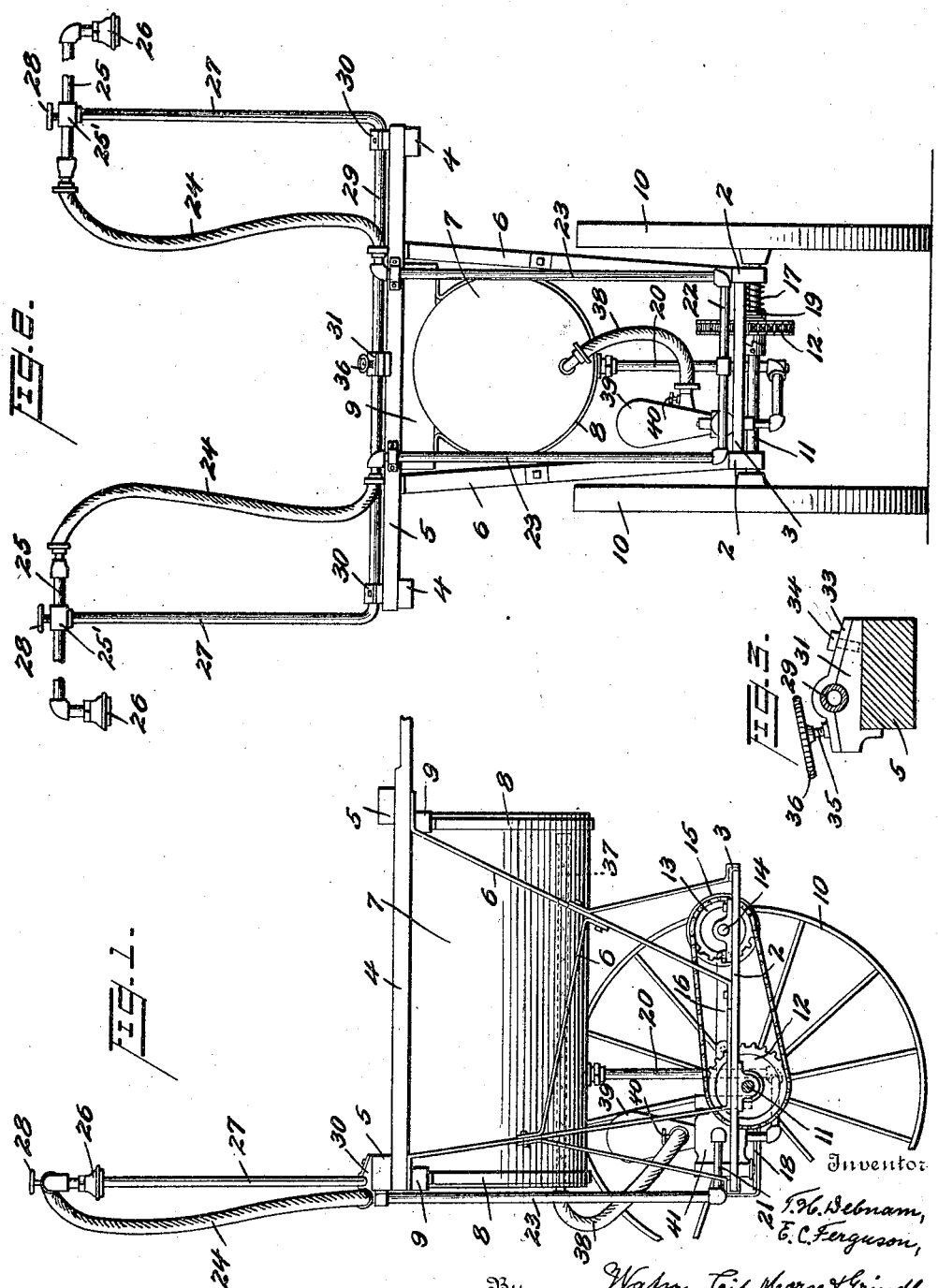

Patented May 27, 1924.

1,495,506

UNITED STATES PATENT OFFICE.

THOMAS H. DEBNAM AND EDWIN C. FERGUSON, OF SUFFOLK, VIRGINIA, ASSIGNORS TO THE BOLL-WEEVIL EXTERMINATOR COMPANY, INC., OF BALTIMORE, MARYLAND, A CORPORATION OF VIRGINIA.

SPRAYER.

Application filed February 8, 1923. Serial No. 617,828.

*To all whom it may concern:*

Be it known that we, THOMAS H. DEBNAM and EDWIN C. FERGUSON, citizens of the United States, and residents of Suffolk, Nansemond County, State of Virginia, have invented certain new and useful Improvements in Sprayers, of which the following is a specification.

This invention relates to sprinkling or spraying apparatus adapted to spray vegetation with insecticide, and is more particularly directed to horse-drawn apparatus of this kind adapted to spray cotton plants for the purpose of killing boll weevils.

The object of the present invention, in general, is to produce a horse-drawn sprayer of mechanically practical construction in which the spraying nozzles are so mounted as to be adjustable over a wide range, in horizontal and vertical planes, to suit the widely different conditions, as to size of plant and distance between plant rows, obtaining in the cotton crops of different localities.

As is generally known, cotton is grown in substantially parallel rows spaced from each other a distance which is not uniform but varies according to the judgment of the individual planter based on certain conditions. It is also a matter of general knowledge that cotton plants grow very much higher in some localities than in others. It is clear therefore that a practical sprayer for cotton plants of the horse drawn type should have the capability of being adjusted to suit plants of different heights and spaces between plant rows of different widths.

The main object of the present invention is to provide a sprayer for cotton plants of the horse-drawn type, in which the spraying nozzles are adjustably supported at the sides of the vehicle so that they may be held at widely different elevations and at different laterally projected positions, for the purpose of adapting the sprayer to a wide range of conditions as to size of plant and distance between plant rows. A further object of the invention is to so mount the spraying nozzles that they may be adjusted to direct the insecticide down on top of the plants or upwardly through the plants at any desired vertical angle, whereby all parts of the foliage and bolls may be thoroughly sprayed.

The sprayer embodying the present invention comprises a wheeled frame adapted to be drawn between the rows of cotton plants by a draft animal, but of course the vehicle can be self-propelled if desired. This frame carries a tank containing liquid insecticide and a pump operated from the axle of the vehicle for feeding the insecticide from the tank to the spraying nozzles under pressure. The spraying nozzles are supported on the frame so as to be rotatable about horizontal axes in vertical arcs of relatively large radius outside the wheels of the vehicle and are also so mounted that they may be projected laterally towards and from the vehicle, and means are provided for holding said nozzles in any adjusted position.

Referring to the accompanying drawings for a particular description of one embodiment of the invention:

Figure 1 is a side view of a horse-drawn vehicle having mounted thereon an apparatus embodying the present invention;

Figure 2 is a rear view of Figure 1; and

Figure 3 is a view of a detail.

The drawings show a two-wheel vehicle carrying the various parts of the spraying apparatus. The frame of the vehicle is composed of a lower member consisting of side bars 2 connected by cross bars 3; an upper member consisting of side bars 4 connected by cross bars 5; and a bracing system 6 connecting the frame members at each side thereof. The side bars 4 of the upper frame member may be extended forwardly to form a pair of shafts for the attachment of a draft animal. A driver's seat (not shown) may be supported centrally of the cross bar 5 of the upper frame member. A tank 7 is suspended and supported from the upper frame member by means of hoops 8 attached to blocks 9, which are secured to the under side of cross bars 5.

The frame and parts supported thereby are carried by a pair of wheels 10, which are secured to an axle 11 journaled in bearings bolted to the side bars 2 of the lower frame member. A double acting pump 41 is mounted on the lower frame member. This pump is operated from the axle 11 by means of gearing, which comprises a sprocket wheel 12 loosely mounted on the axle, a sprocket wheel 13 secured to a shaft 14, which is journaled in bearings carried by the lower frame member, a crank disk 15 secured to the end of shaft 14, and a link 16 connecting said crank disk to the piston rod of the pump. The sprocket wheel 12 has a toothed hub adapted to engage a toothed collar fixed to axle 11. A coil spring 17 surrounding the axle tends to hold the teeth of said hub and collar engaged. A suitable lever 18 is provided with a forked end engaging a groove in a boss 19 formed on sprocket wheel 12. Lever 18 is adapted to be operated by the foot of the driver to unclutch sprocket 12 whenever it is desired to discontinue the action of the pump.

The intake of the pump is connected by a pipe 20 to tank 7, and the discharge is connected by a pipe 21 to a horizontal pipe 22, which in turn is connected to a pair of vertical pipes 23 suitably secured to the rear cross bar 5 of the upper frame member. Swiveled in the upper end of each pipe 23 is a flexible hose 24, which also has a swivel connection at its other end with a pipe 25. A spraying nozzle 26 is connected to the outer end of each pipe 25. Pipes 25 pass through T fittings 25' screwed to the outer ends of arms 27, and are adapted to be clamped in said fittings by set screws 28. Arms 27 are formed with and extend at right angles from a shaft or pipe 29, which is rotatably supported on the rear cross bar 5 of the upper frame member. The means for mounting the pipe 29 comprises end bearings 30 and a central bearing 31. Pipe 29 is rotatable in its bearings and is adapted to be clamped at adjusted positions by means associated with the central bearing 31. This central bearing and associated clamping means is shown more clearly in Figure 3. It comprises a block 31 and a cap 33. Cap 33 is somewhat loosely bolted to block 31 by bolt 34, adjacent its forward end, and is connected to said block adjacent its rear end by a screw 35 having a knurled head 36. When screw 35 is tightened, pipe 29 is clamped between the block and cap, while by slackening the screw, pipe 29 is released and may be rotated to any desired position.

It will be observed that the mounting of the nozzles permits adjustment thereof vertically and horizontally. By rotating shaft 29 the nozzles may be positioned at any elevation within the range of the apparatus and then fixed in such position by tightening the screw 35, the flexible and swiveled hose connections 24 permitting this adjustment. It will be further observed that said nozzles may be projected laterally towards and from the vehicle by sliding the pipe connections 25 in their bearings 25' and may be fixed in any desired laterally projected position by tightening the screws 28. It will also be observed that the nozzles have a further adjustment whereby they may be positioned to spray the plants at any vertical angle. The last adjustment referred to is obtained by rotating the pipes 25 in the bearings 25 so that the nozzles 26 will be directed upwardly, the swivel connections of said pipes with the hose 24 permitting this adjustment. The combined result of these adjustments effects great flexibility of the apparatus and adapts it for use under widely different conditions.

In order to prevent the accumulation of sediment in the bottom of the tank and to maintain the solution contained by said tank in uniform condition, means is provided for continuously agitating said solution during the operation of the sprayer. This means consists of a perforated pipe 37 arranged longitudinally in the tank adjacent the bottom thereof, and a connection 38 between this pipe and the discharge of the pump. Preferably the connection is made to the air dome 39 of the pump, an escape 40 being placed in the connection, which opens under excess pressure.

Although one embodiment of the invention has been described with great particularity, it is clear that various changes and modifications may be made in the described apparatus without departing from the essentials of the invention, and it is desired to state therefore that the invention is not intended to be limited except as defined in the following claims.

Having thus described the invention what is claimed as new and desired to be secured by Letters Patent is:

1. A sprayer comprising a frame consisting of upper and lower members each composed of longitudinal side bars connected by transverse bars and bracing members connecting said upper and lower longitudinal bars, a tank suspended from the upper frame member, an axle journaled in the lower frame member, wheels fixed to the ends of said axle, a pump supported by said lower frame member, gearing actuated by said axle for operating said pump, a connection between said tank and the intake of said pump, a shaft rotatably mounted on said upper frame member at the rear thereof, arms extending at an angle from the ends of said shaft, nozzles supported by said arms, and connections including flexible conduits between said nozzles and the discharge of said pump.

2. A sprayer comprising a frame consisting of upper and lower horizontal members connected by vertical bracing members, each of said upper and lower members being composed of longitudinal side bars connected by transverse bars, a tank suspended from the upper frame member, an axle journaled in bearings carried by the lower side bars of the frame, wheels fixed to the ends of said axle, a pump supported by said lower frame member, a gearing actuated by said axle for operating said pump, a connection between said tank and the intake of said pump, a perforated pipe in the lower part of said tank connected to the discharge of said pump, a transverse shaft rotatably mounted on said upper frame member at the rear thereof, means for clamping said shaft in adjusted positions, arms extending at substantially right angles from the ends of said shaft, pipes rotatably and slidably mounted in the ends of said arms, nozzles extending at an angle from the outer ends of said pipes, means for clamping said pipes in adjusted positions, flexible hose having outer ends swiveled in the inner ends of said pipes, conduits connected to the discharge of said pump, the inner ends of said hose being swiveled in the upper ends of said conduits adjacent said transverse shaft.

In testimony whereof we hereunto affix our signatures.

THOMAS H. DEBNAM.
EDWIN C. FERGUSON.